(12) United States Patent
Kim et al.

(10) Patent No.: US 8,833,201 B2
(45) Date of Patent: Sep. 16, 2014

(54) PEDAL DEVICE FOR VEHICLE

(75) Inventors: Eunsik Kim, Daegu (KR); Hojong Oh, Busan (KR); Yangrae Cho, Hwaseong-si (KR); Jeehyuck Choi, Hwaseong-si (KR)

(73) Assignees: Hyundai Motor Company, Seoul (KR); Donghee Industrial Co., Ltd., Ulsan (KR)

( * ) Notice: Subject to any disclaimer, the term of this patent is extended or adjusted under 35 U.S.C. 154(b) by 568 days.

(21) Appl. No.: 13/191,937

(22) Filed: Jul. 27, 2011

(65) Prior Publication Data

US 2012/0137822 A1 Jun. 7, 2012

(30) Foreign Application Priority Data

Dec. 3, 2010 (KR) ........................ 10-2010-0122766

(51) Int. Cl.
*G05G 1/30* (2008.04)
*B60K 26/02* (2006.01)
*B60T 7/06* (2006.01)
*B60K 23/00* (2006.01)

(52) U.S. Cl.
CPC ........... *B60K 26/02* (2013.01); *B60K 2023/005* (2013.01); *G05G 1/30* (2013.01); *B60K 26/021* (2013.01); *B60T 7/06* (2013.01)
USPC .............................................. 74/512; 74/560

(58) Field of Classification Search
CPC ............. G05G 1/30; G05G 1/36; G05G 1/38; B60K 26/021
USPC ............................................ 74/512–514, 560
IPC ....................................... G05G 1/30, 1/36, 1/38
See application file for complete search history.

(56) References Cited

U.S. PATENT DOCUMENTS

| | | | |
|---|---|---|---|
| 6,443,028 B1 * | 9/2002 | Brock | 74/512 |
| 6,701,799 B2 * | 3/2004 | Cicotte | 74/512 |
| 2004/0163488 A1 * | 8/2004 | Reimann et al. | 74/512 |

FOREIGN PATENT DOCUMENTS

| | | |
|---|---|---|
| JP | 2002-528320 A | 9/2002 |
| JP | 2002-287837 A | 10/2002 |
| JP | 2005-153713 A | 6/2005 |
| JP | 2010-26569 A | 2/2010 |
| KR | 1999-0059716 A | 7/1999 |
| KR | 10-2007-0056028 A | 5/2007 |
| KR | 10-0844559 B1 | 7/2008 |
| KR | 10-0934994 B1 | 12/2009 |

* cited by examiner

*Primary Examiner* — Thomas Diaz
(74) *Attorney, Agent, or Firm* — Morgan, Lewis & Bockius LLP

(57) ABSTRACT

A pedal device for a vehicle may include a brake pedal and an accelerator pedal which may be pivotally installed in a movable panel, an electric device selectively moving the movable panel, and an eco device transferring a motion of the electric device to the accelerator pedal to adjust a pedal effort of the accelerator pedal or vibrate the accelerator pedal.

6 Claims, 6 Drawing Sheets

PEDAL DEVICE FOR VEHICLE

CROSS-REFERENCE TO RELATED APPLICATIONS

The present application claims priority to Korean Patent Application Number 10-2010-0122766 filed Dec. 3, 2010, the entire contents of which application is incorporated herein for all purposes by this reference.

BACKGROUND OF THE INVENTION

1. Field of the Invention

The present invention relates to a pedal device for a vehicle, and more particularly, to a pedal device for a vehicle, which can simultaneously perform a function of adjusting a distance of a brake pedal and an accelerator pedal and a function of adjusting a pedal effort of the accelerator pedal through a single electric device.

2. Description of Related Art

Examples of a conventional pedal device for a vehicle include a brake pedal used for decelerating or stopping the vehicle, and an accelerator pedal used for accelerating the vehicle.

The pedals are pivotable according to a driver's manipulation, but it is general that the pedals are installed in a vehicle body so as not to move back and forth along a longitudinal direction of a vehicle body.

However, when driver with a variety of physical conditions sits in a driver's seat, driver adjusts a distance between his/her body and the pedals by pushing or pulling the driver's seat in the forward and backward directions of the vehicle in order to facilitate the manipulation of the pedals, but the mere adjustment of the driver's seat may be inadequate to optimally adjust the distance between the pedals and body.

To solve this, adjustable pedal devices which are installed to be movable in the forward and backward directions of the vehicle have been proposed.

Meanwhile, the fuel efficiency of the vehicle may be lowered by the driver's excessive manipulation of the accelerator pedal according to the driver's driving habit. To prevent this, a so-called eco accelerator pedal device which gives a driver a warning by adjusting the pedal effort of the accelerator pedal differently than normally or vibrating the accelerator pedal has been also proposed.

The adjustable pedal device and the eco accelerator pedal device use an electric device such as a motor or a solenoid, respectively, but such an electric device has a disadvantage in that its structure is complicated and its manufacturing cost is high.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pedal device for a vehicle, which can be simplified in structure and constructed at a low cost because it can adjust a distance of a brake pedal and provide an eco function of an accelerator pedal simultaneously through a single electric device such as a motor or a solenoid.

A pedal device for a vehicle, may include a brake pedal and an accelerator pedal which may be pivotally installed in a movable panel, an electric device selectively moving the movable panel, and an eco device transferring a motion of the electric device to the accelerator pedal to adjust a pedal effort of the accelerator pedal or vibrate the accelerator pedal.

The electric device may include an actuator, wherein the actuator may be a linear motor with a screw shaft or a solenoid with a plunger.

The eco device may include an eco electromagnet slidably fitted to the actuator and selectively engaged to the actuator by generating a magnetic force when the eco electromagnet receives an operation signal, an eco providing lever extends from the eco electromagnet with a predetermined length and including an assembly slot therein, and an accelerator pedal pin integrally formed in the accelerator pedal and slidably fitted to the assembly slot.

A guide shaft may be formed in the movable panel, and a guide slot may be formed in a housing, the guide shaft being slidably fitted to the guide slot and guided therethrough.

The guide shaft may be formed to may have a rectangular cross section, and the guide slot may be formed in the housing in a rectangular shape to slidably receive the guide shaft therein.

The housing may include two side planes in which the guide slot may be formed, respectively, and a front plane in which the electric device may be installed and connects the side planes, wherein a top side, a bottom side, and a rear side of the housing may be opened.

An end of a first push rod may be pivotally coupled to the brake pedal, a second push rod to which the other end of the first push rod may be slidably fitted may be formed to protrude toward the brake pedal from a brake booster so as to selectively increase a pedal effort of the brake pedal, and a brake pedal electromagnet may be installed to the first push rod to integrally couple the first push rod and the second push rod by generating a magnetic force thereto when the brake pedal electromagnet receives an operation signal.

A through-hole may be formed at a side of the movable panel, the first push rod may be inserted into the through-hole and protrudes toward the brake booster, and a plurality of guide pins may be formed to protrude in the brake booster and may be inserted into the through-hole to guide the motion of the movable panel.

A housing electromagnet may be installed adjacent to the guide slot of the housing and fixes the movable panel to the housing by generating a magnetic force when the housing electromagnet receives an operation signal.

A movable panel electromagnet may be installed in the movable panel and integrally couples the actuator of the electric device and the movable panel by generating a magnetic force when the movable panel electromagnet receives an operation signal.

According to the exemplary embodiments of the present invention, the brake pedal and the accelerator pedal may be installed pivotally in the movable panel, and the movable panel may be coupled to be moved by the single electric device. Thus, due to the operation of the single electric device, the distance between the driver and the brake pedal and between the driver and the accelerator pedal can be easily adjusted. Since the motion of the single electric device may be transferred through the link as the increased pedal effort or vibration to the accelerator pedal, the eco function of the accelerator pedal can be simply implemented. In addition, the overall structure may be simplified and the manufacturing cost may be reduced.

The methods and apparatuses of the present invention have other features and advantages which will be apparent from or are set forth in more detail in the accompanying drawings,

Figure 1:
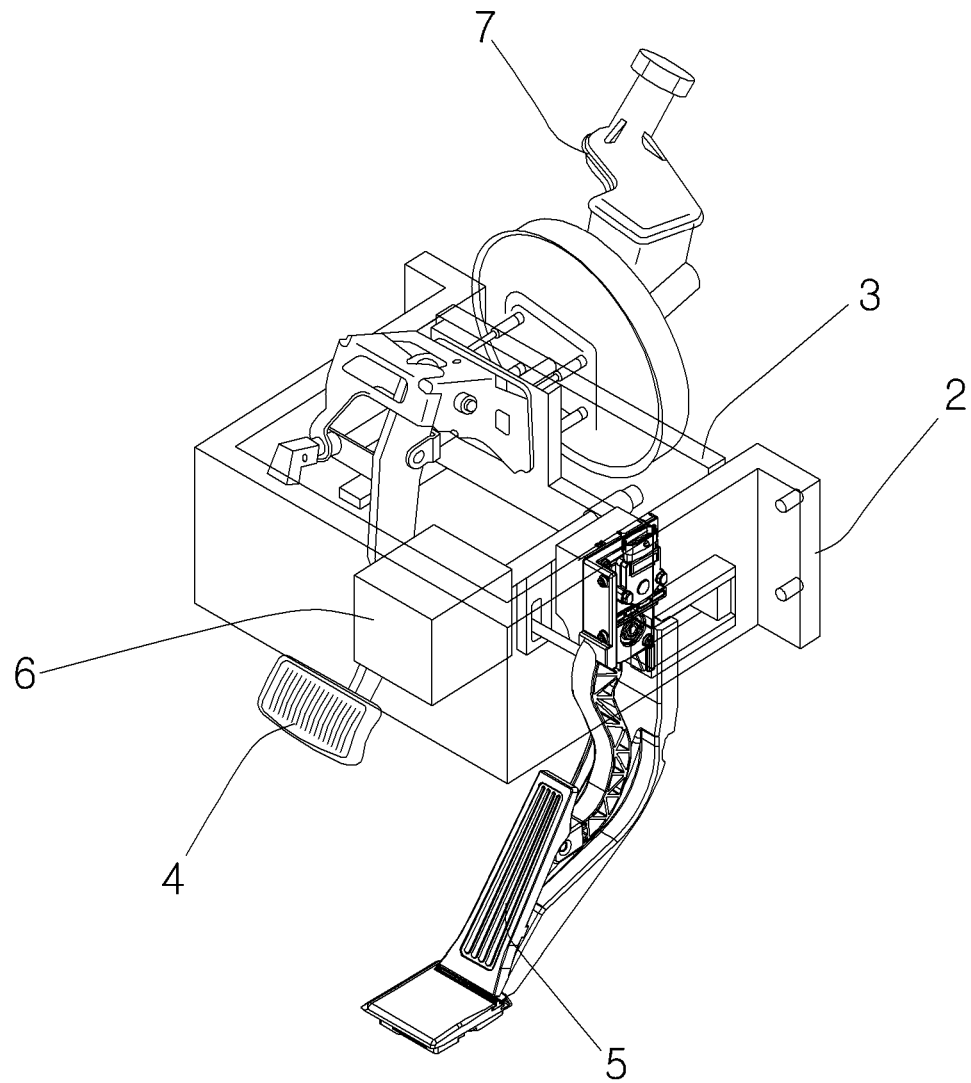
FIG. 1 is a perspective view of a pedal device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 2:
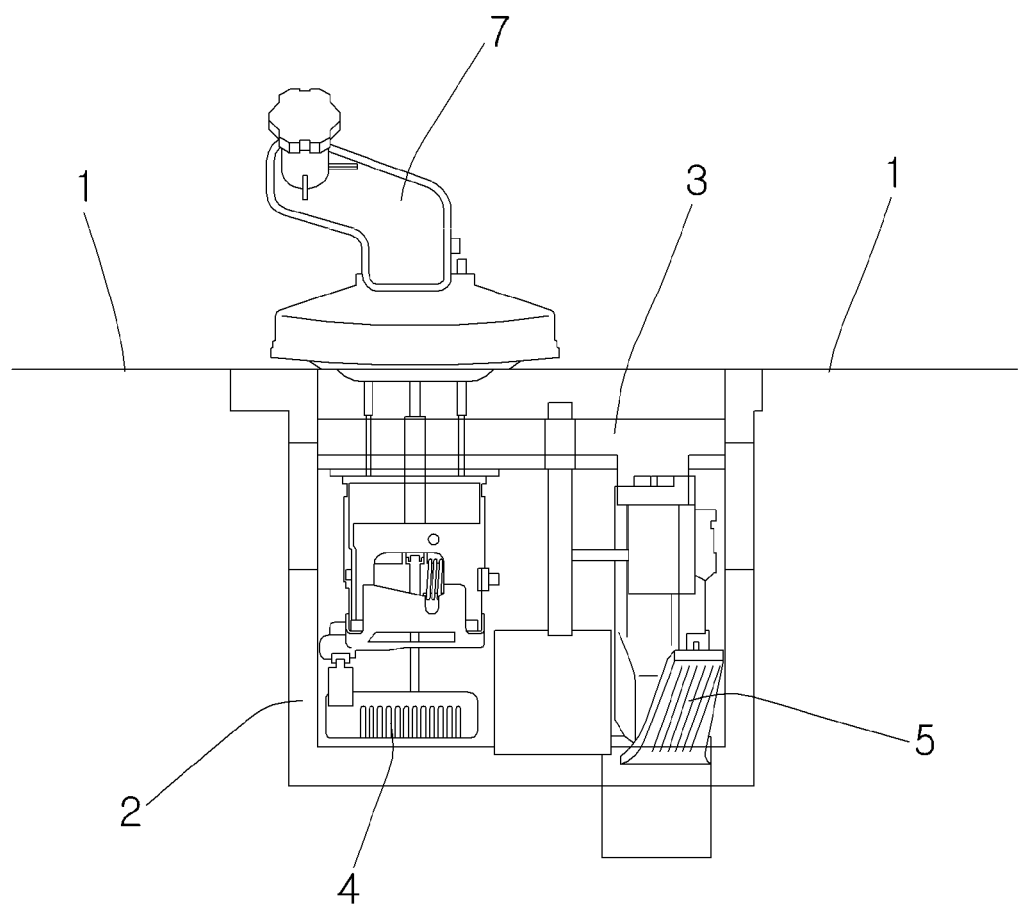
FIG. 2 is a plan view of the pedal device according to the exemplary embodiment of the present invention.

Referring to FIGS. 1 and 2, a pedal device according to an exemplary embodiment of the present invention includes a housing 2 mounted to be fixed to a vehicle body panel 1, a movable panel 3 installed movably in housing 2, a brake pedal 4 and an accelerator pedal 5 installed pivotally in movable panel 3, and a single electric device 6 moving movable panel 3.

A brake booster 7 is installed to be fixed to vehicle body panel 1, and brake booster 7 is coupled to be interworked with brake pedal 4 such that the pedal effort of brake pedal 4 is transferred thereto.

When electric device 6 is operated, movable panel 3 is moved in the forward and backward direction of the vehicle by electric device 6, and a distance between brake pedal 4 installed in movable panel 3 and a driver and a distance between accelerator pedal 5 and the driver are automatically adjusted at the same time.

Electric device 6 is constructed with a linear motor or a solenoid.

When an operation signal is applied to electric device 6, a motor shaft of the linear motor rotates or a plunger of the solenoid moves back and forth, and therefore, movable panel 3 is moved.

Figure 3:
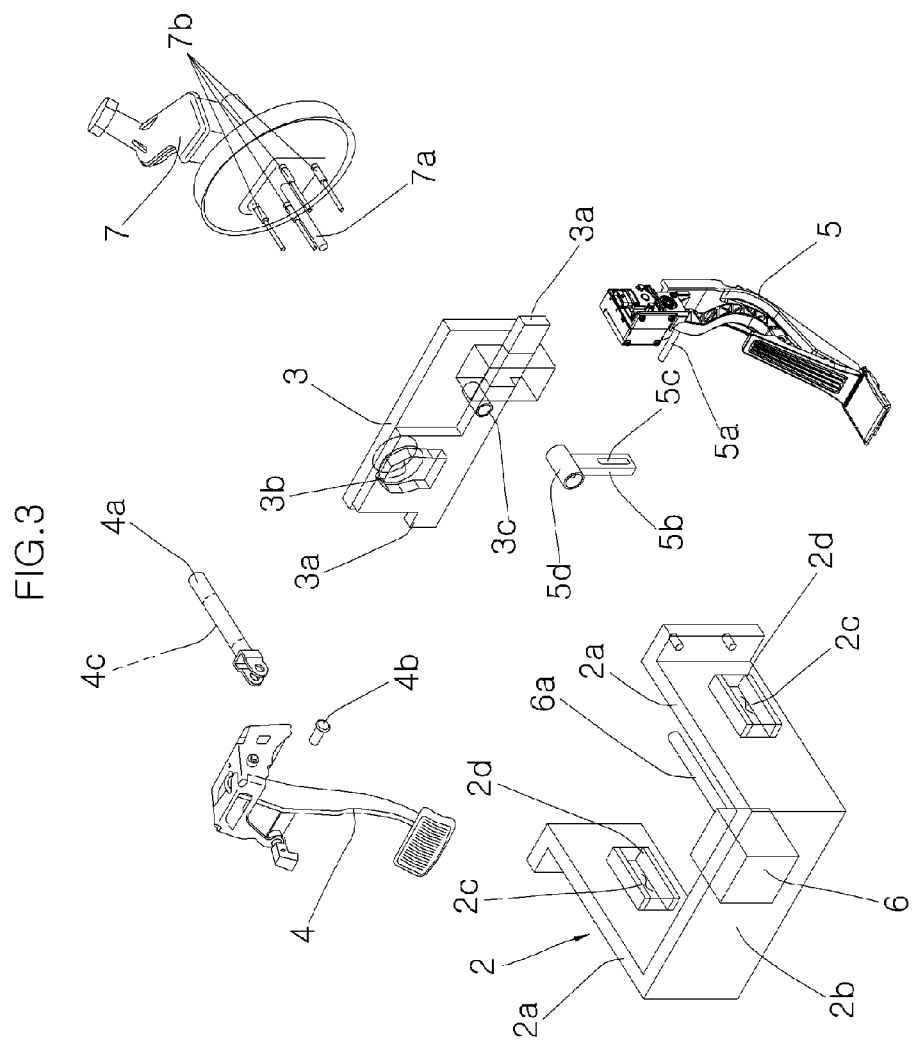
FIG. 3 is an exploded perspective view of the pedal device according to the exemplary embodiment of the present invention.

Referring to FIG. 3, one end of a first push rod 4a is coupled to brake pedal 4 by a pin 4b, so that first push rod 4a is integrally coupled to brake pedal 4. First push rod 4a is formed in a pipe shape, and a brake pedal electromagnet 4c is installed inside first push rod 4a.

The other end of first push rod 4a is fitted and coupled to a second push rod 7a which is installed to protrude toward brake pedal 4 in brake booster 7.

When the operation signal is applied to brake pedal electromagnet 4c, brake pedal electromagnet 4c is magnetized, and a magnetic force generated at that time couples first push rod 4a to second push rod 7a so that they are integrally fixed. On the other hand, when electromagnet 4c is not magnetized, first push rod 4a is movable along second push rod 7a in such a state that first push rod 4a is fitted to second push rod 7a.

Housing 2 has two side planes 2a and a front plane 2b coupling an interval therebetween, and a top side, a bottom side, and a rear side of housing 2 are opened.

Guide slots 2c passing through two side planes 2a are formed in two side planes 2a, respectively, and housing electromagnets 2d are installed at edges of guide slots 2c. Electric device 6 is installed in front plane 2b such that an actuator 6a such as a screw shaft or plunger protrudes toward the rear side.

Movable panel 3 is formed in a rectangular panel shape and is inserted between two side planes 2a of housing 2. Guide shafts 3a protruding left and right are formed in moving panel 3. Guide shafts 3a are formed to have a rectangular cross section, and guide slots 2c of housing 2, which guide shafts 3a are inserted into and guided by, are also formed in a rectangular shape.

A through-hole 3b is formed at one side of movable panel 3. First push rod 4a is inserted through through-hole 3b and is coupled to second push rod 7a.

A movable panel electromagnet 3c, to which the actuator 6a is fitted and coupled, is installed in movable panel 3. Movable panel electromagnet 3c is formed in a pipe shape, and the actuator 6a is formed in a rod shape so that it is relatively movably fitted and coupled to movable panel electromagnet 3c.

A plurality of guide pins 7b protruding toward movable panel 3 are provided in brake booster 7. Guide pins 7b are inserted into through-hole 3b of movable panel 3 and serve as a guide when movable panel 3 is moved.

An accelerator pedal pin 5a is installed to protrude from one side of accelerator pedal 5, and accelerator pedal pin 5a is inserted into and coupled to an assembly slot 5c of an eco providing lever 5b. Assembly slot 5c is an elongated hole which is formed long along a longitudinal direction thereof.

A pipe-shaped eco electromagnet 5d is integrally installed in eco providing lever 5b, and eco electromagnet 5d is movably fitted and coupled to the outer periphery of the actuator 6a.

Figure 4:
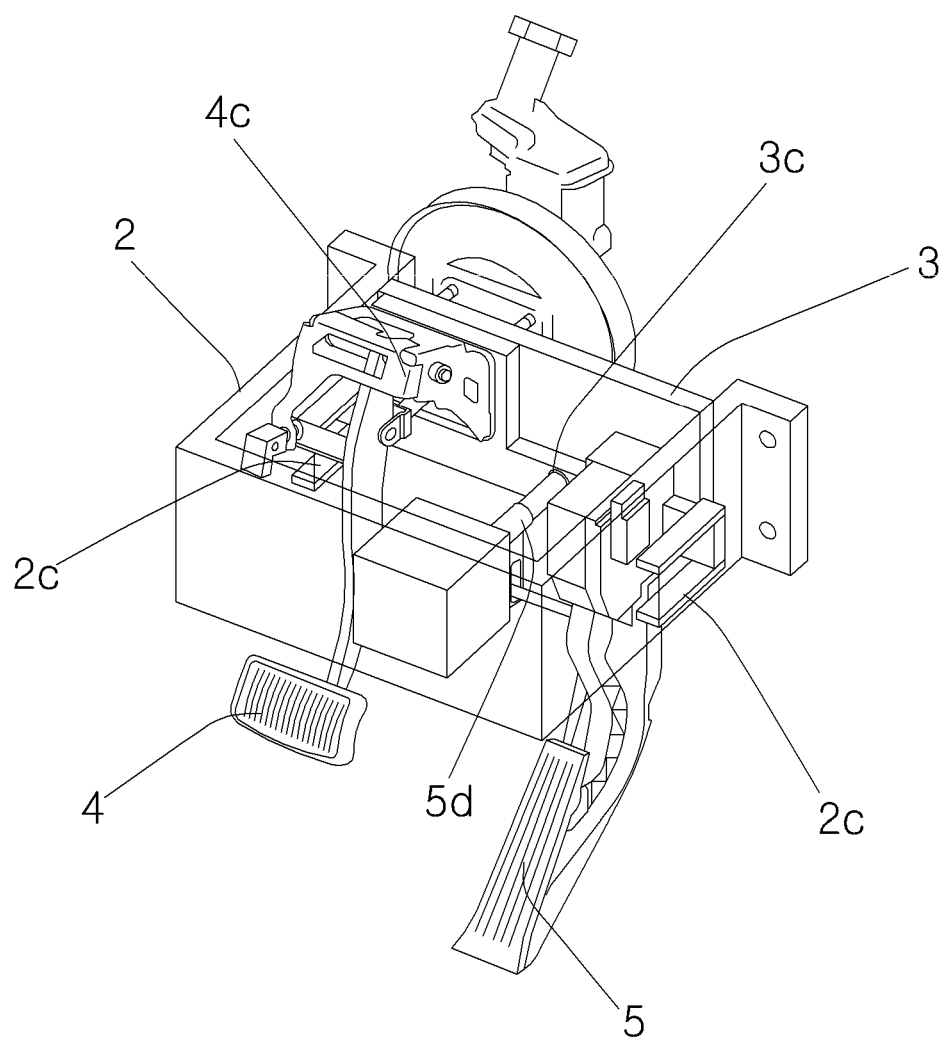
FIG. 4 is a view explaining a normal state operation of the pedal device according to the exemplary embodiment of the present invention.

A normal operation state of the pedal device according to the exemplary embodiment of the present invention is illustrated in FIG. 4. In the normal state, the operation signal is applied to housing electromagnet 2c and brake pedal electromagnet 4c, respectively, and the electromagnets are magnetized. Therefore, first push rod 4a of brake pedal 4 is integrally coupled to second push rod 7a of brake booster 7 through brake pedal electromagnet 4c. Due to the magnetic force of housing electromagnet 2c, movable panel 3 is maintained in a state in which it is fixed to housing 2. No operation signal is applied to movable panel electromagnet 3c and eco electromagnet 5d, respectively.

Figure 5:
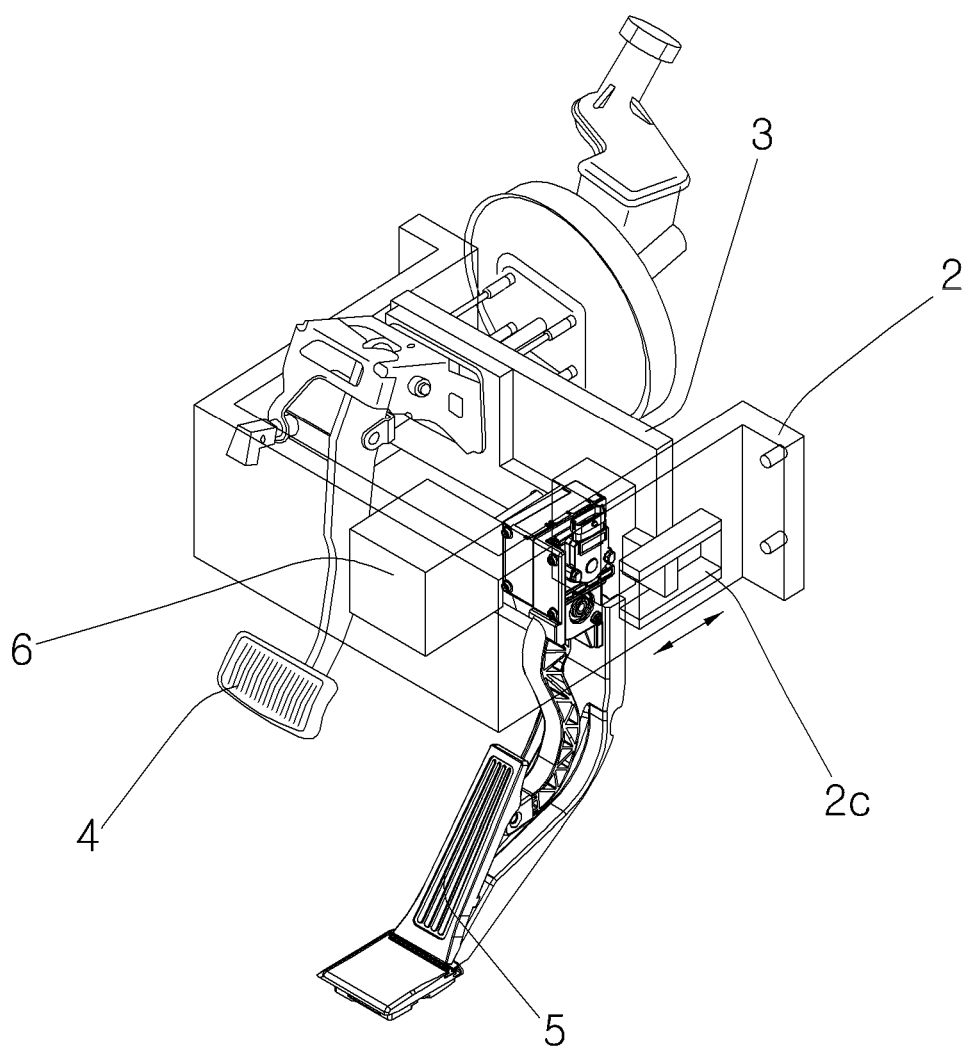
FIG. 5 is a view explaining a distance adjustment state operation of the pedal device according to the exemplary embodiment of the present invention.

A distance adjustment operation state of the pedal device according to the exemplary embodiment of the present invention is illustrated in FIG. 5. In order to adjust the distance between the driver and the pedal, no operation signal is applied to housing electromagnet 2c. Therefore, movable panel 3 can be moved in the forward or backward direction of the vehicle with respect to housing 2. In addition, since no operation signal is applied to brake pedal electromagnet 4c, first push rod 4a of brake pedal 4 can be moved in a state in which it is fitted to second push rod 7a of brake booster 7.

The operation signal is applied to movable panel electromagnet 3c and thus movable panel electromagnet 3c is magnetized. Therefore, the actuator 6a of electric device 6 and movable panel 3 are integrally coupled. No operation signal is applied to eco electromagnet 5d. When electric device 6 is operated in this state, that is, when the screw shaft is rotated, movable panel 3 is moved in the forward or backward direction of the vehicle, while being guided by guide slots 2c in a state in which movable panel 3 is inserted into housing 2. In this manner, the distance between the driver and the pedal is automatically adjusted. When electric device 6 is a solenoid, plunger 6a is moved in the forward or backward direction of the vehicle, and the position of movable panel 3 is adjusted.

Figure 6:
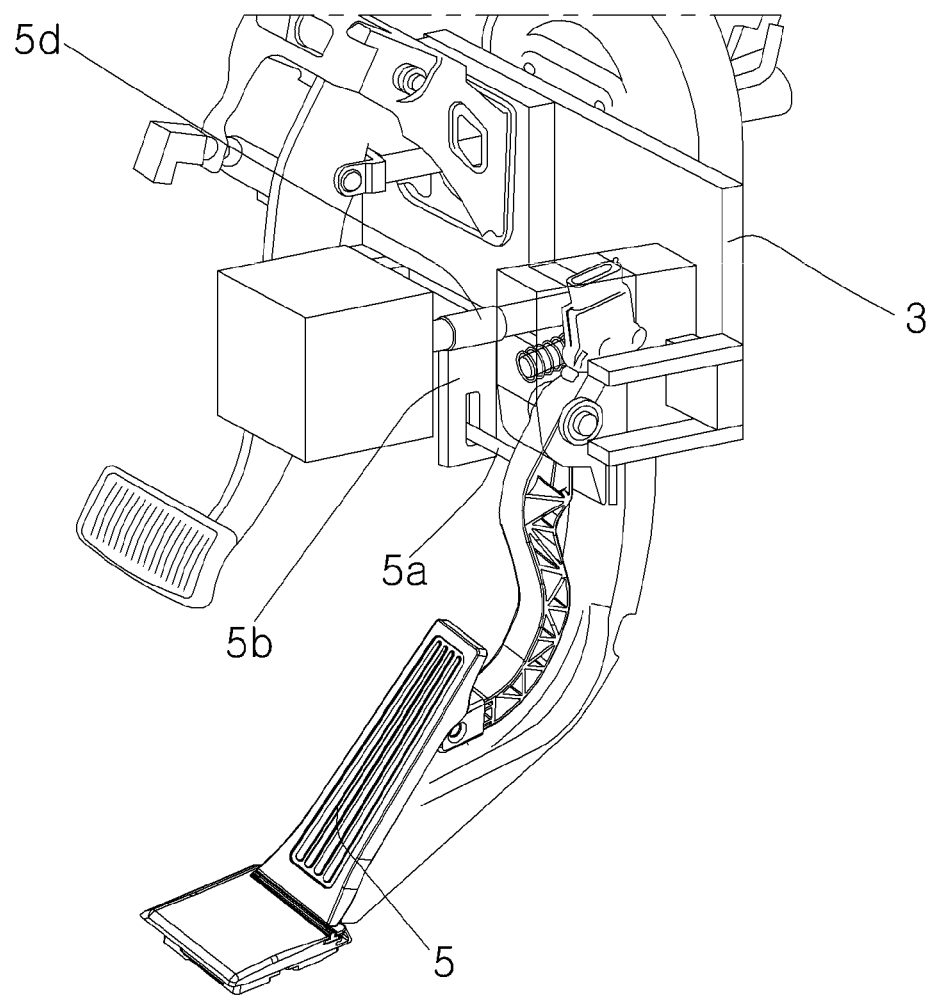
FIG. 6 is a view explaining an eco state operation of the pedal device according to the exemplary embodiment of the present invention.

An eco mode operation state of the pedal device according to the exemplary embodiment of the present invention is illustrated in FIG. 6. While the operation signal is applied to housing electromagnet 2c, brake pedal electromagnet 4c, and eco electromagnet 5d, no operation signal is applied to movable panel electromagnet 3c. Therefore, accelerator pedal 5 is integrally coupled to the actuator 6a of electric device 6 through eco electromagnet 5d. When electric device 6 is operated in this state, the forward and backward motion of the actuator 6a of electric device 6 is transferred to accelerator pedal 5 through eco providing lever 5b and accelerator pedal pin 5a, as indicated by an arrow. Thus, a warning of the excessive manipulation of the accelerator pedal is given to the driver by increasing the pedal effort of accelerator pedal 5 which the driver manipulates, or vibrating the accelerator pedal.

Elongated assembly slot 5c formed in eco providing lever 5b absorbs the position change of accelerator pedal slot 5a when accelerator pedal 5 is manipulated.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedal device for a vehicle, comprising:
   a brake pedal and an accelerator pedal which are pivotally installed in a movable panel;
   an electric device selectively moving the movable panel; and
   an eco device transferring a motion of the electric device to the accelerator pedal to adjust a pedal effort of the accelerator pedal or vibrate the accelerator pedal;
   wherein the electric device comprises an actuator; and
   wherein the eco device comprises:
      an eco electromagnet slidably fitted to the actuator and selectively engaged to the actuator by generating a magnetic force when the eco electromagnet receives an operation signal;
      an eco providing lever extends from the eco electromagnet with a predetermined length and including an assembly slot therein; and
      an accelerator pedal pin integrally formed in the accelerator pedal and slidably fitted to the assembly slot.

2. The pedal device as defined in claim 1, wherein the actuator is a linear motor with a screw shaft or a solenoid with a plunger.

3. The pedal device as defined in claim 1, wherein a movable panel electromagnet is installed in the movable panel and integrally couples the actuator of the electric device and the movable panel by generating a magnetic force when the movable panel electromagnet receives an operation signal.

4. A pedal device for a vehicle, comprising:
   a brake pedal and an accelerator pedal which are pivotally installed in a movable panel;
   an electric device selectively moving the movable panel;
   an eco device transferring a motion of the electric device to the accelerator pedal to adjust a pedal effort of the accelerator pedal or vibrate the accelerator pedal, wherein an end of a first push rod is pivotally coupled to the brake pedal;
   a second push rod to which the other end of the first push rod is slidably fitted is formed to protrude toward the brake pedal from a brake booster so as to selectively increase a pedal effort of the brake pedal, and
   a brake pedal electromagnet is installed to the first push rod to integrally couple the first push rod and the second push rod by generating a magnetic force thereto when the brake pedal electromagnet receives an operation signal; and
wherein a through-hole is formed at a side of the movable panel,
   the first push rod is inserted into the through-hole and protrudes toward the brake booster, and
   a plurality of guide pins are formed to protrude in the brake booster and are inserted into the through-hole to guide the motion of the movable panel.

5. A pedal device for a vehicle, comprising:
   a brake pedal and an accelerator pedal which are pivotally installed in a movable panel;
   an electric device selectively moving the movable panel; and
   an eco device transferring a motion of the electric device to the accelerator pedal to adjust a pedal effort of the accelerator pedal or vibrate the accelerator pedal;
   wherein a guide shaft is formed in the movable panel, and a guide slot is formed in a housing, the guide shaft being slidably fitted to the guide slot and guided therethrough;
   wherein the housing includes two side planes in which the guide slot is formed, respectively, and a front plane in which the electric device is installed and connects the side planes, wherein a top side, a bottom side, and a rear side of the housing are opened; and
   wherein a housing electromagnet is installed adjacent to the guide slot of the housing and fixes the movable panel to the housing by generating a magnetic force when the housing electromagnet receives an operation signal.

6. The pedal device as defined in claim 5, wherein the guide shaft is formed to have a rectangular cross section, and the guide slot is formed in the housing in a rectangular shape to slidably receive the guide shaft therein.

\* \* \* \* \*